United States Patent [19]
Fahmi et al.

[11] Patent Number: 6,108,303
[45] Date of Patent: Aug. 22, 2000

[54] METHOD AND APPARATUS FOR TRAFFIC CONTROL IN A CELL-BASED NETWORK

[75] Inventors: Maher Nihad Fahmi, North Vancouver; John Richard Bradshaw, Burnaby, both of Canada

[73] Assignee: PMC-Sierra Ltd., Canada

[21] Appl. No.: 08/863,586

[22] Filed: May 27, 1997

Related U.S. Application Data

[63] Continuation-in-part of application No. 08/568,379, Dec. 6, 1995, Pat. No. 5,668,797.

[51] Int. Cl.[7] ........................................... H04J 3/14
[52] U.S. Cl. ................................ 370/230; 370/253
[58] Field of Search ................................. 370/229, 230, 370/232, 233, 234, 252, 253, 395, 242

[56] References Cited

U.S. PATENT DOCUMENTS 5,666,353  9/1997  Klausmeier et al. .............. 370/230
5,737,312  4/1998  Sasagawa ......................... 370/253
5,784,358  7/1998  Smith et al. ...................... 370/395

OTHER PUBLICATIONS

ITU–T Recommendation I.371 dated Mar. 1993 "Integrated Services Digital Network (ISDN) Overall Network Aspects and Functions Traffic Control and Congestion Control in B–ISDN".

Asynchronous Transfer Mode Solution for Broadband ISDN (2nd ed) p. 293 (figure 7.1) by Martin de Prycker (c) 1993 ISBN 0–13–178 542–7, Dec. 93?.

Relevant art not overtly prior art w.r.t. ASN 08/863,586: U.S. Patent 5,859,850 (Lein,R.L.) Filed Dec. 28, 1995, Jan. 12, 1999.

*Primary Examiner*—Chau Nguyen
*Assistant Examiner*—Frederic D. Wolkow
*Attorney, Agent, or Firm*—Hall, Priddy & Myers

[57] ABSTRACT

A method and apparatus for traffic control in an ATM-based network is provided to avoid congestion of traffic flows and false identifications of conforming and non-conforming cells.

30 Claims, 11 Drawing Sheets

TAT the theoretical or nominal time of arrival of a cell assuming equally spaced cells I an increment parameter k kth cell after the first cell ta(k) time of arrival of a cell L limit parameter ( L = 0.5δ )

( L = 1.5δ )

( L = 3.5δ )

METHOD AND APPARATUS FOR TRAFFIC CONTROL IN A CELL-BASED NETWORK

This application is a continuation-in-part of application Ser. No. 08/568,379, filed Dec. 6, 1995, now U.S. Pat. No. 5,668,797.

FIELD

The present invention relates to a method and apparatus for traffic control of cell traffic in cell-based transmission systems such as asynchronous transfer mode (ATM) based networks.

BACKGROUND

Traffic management is critical to the successful operation of cell-based transmission in ATM-based networks. Cell-based transmission systems are subject to congestion caused by unpredictable statistical fluctuations of traffic flows and fault conditions within the network. Congestion of such systems refers to the state of network elements, such as switches, concentrators, cross-connects and transmission links, in which the network is not able to meet the negotiated network performance objectives for the already established connections and/or for the new connection requests. In the absence of effective traffic management, traffic loads from users can exceed the capacity of the network, resulting in an overall degradation of network performance and the loss of data.

In order to manage transfer capacity needs and satisfy network performance objectives, reliable and effective traffic control functions are required. Traffic control in such systems refers to the set of actions taken by the network to avoid congested conditions. The primary role of traffic control is to protect the network while providing users with the Quality of Service (QOS) objectives agreed upon between each user and the network for the particular ATM connection. Traffic control is also important to optimize the use of network resources.

In an ATM-based network, the traffic control strategy is based on determining whether an ATM connection (VPC or VCC) can be accommodated at the User Network Interface (UNI) and negotiating the performance parameters that will be supported. Traffic parameters describe the traffic characteristics of an ATM connection. For example, traffic parameters may describe peak cell rate (PCR), cell delay variation (CDV), burst tolerance (BT), sustainable cell rate (SCR), peak duration and/or source type (e.g. constant bit rate and variable bit rate video, bulk data, voice, e-mail). When a user requests a new ATM connection the user must specify the traffic parameters for that connection. The user specifies the traffic parameters by selecting a QOS from the QOS classes provided by the network. The connection is accepted by the network if the necessary resources are available to support the traffic level while maintaining the agreed upon QOS for existing connections.

Where a connection is established, the network and the user enter into a "traffic contract". The traffic contract refers to the negotiated characteristics of an ATM connection at the private or public UNI, and includes the conformance definition that is used to unambiguously specify the conforming cells of the connection. The agreed upon QOS is provided by the network for so long as the user complies with the traffic contract.

The conformance definition used to specify conforming cells of an ATM connection at the UNI is based on the generic cell rate algorithm (GCRA) described in ITU-T Recommendation I.371, prepared by ITU-T Study Group XVIII and published by the International Telecommunication Union (ITU) in March 1993 (referred to here as "ITU-T I.371"). The GCRA is used to determine whether traffic conforms to the traffic contract. Two equivalent algorithms are identified in ITU-T I.371, namely the virtual scheduling algorithm and a continuous-state leaky bucket algorithm. In making these algorithms realizable in hardware, finite word lengths must be used to represent arrival times and other traffic parameters. As a result, a specific traffic control mechanism is susceptible to committing errors by taking policing actions on a compliant (i.e. conforming) connection, in other words declaring a cell as non-compliant (non-conforming) although the connection is actually compliant (conforming). It can also fail to take the appropriate policing actions on a non-compliant connection. Inappropriate actions on a compliant or non-compliant connection are part of the overall network performance degradation.

A significant improvement in the prior art is found in our co-pending application Ser. No. 08/568,379 filed Dec. 6, 1995 and entitled TRAFFIC CONTROLLER FOR CELL-BASED TRANSMISSION, which is incorporated herein by reference. In this co-pending application there is disclosed a traffic control device and method for identifying cells as either conforming or non-conforming in a cell-based transmission system. The device disclosed includes an n-bit word length counter having an input coupled to a source of clock pulses, a parallel n-bit word length gate coupled to a parallel output of the n-bit word-length counter and having a gate input coupled to a source of cell arrival signals. A processor is also provided, coupled to an output of the gate and which determines on a periodic basis whether an arriving cell is compliant or non-compliant with traffic parameters. The processor includes means for determining if a theoretical arrical time, TAT, is less than an arrival time for a $k^{th}$ cell, $t_a(k)$, where k is an integer, or an $(n-1)^{th}$ bit of $t_a(k)$, namely $t_a(k) [n-1]$, is zero and an $(n-1)^{th}$ bit of an arrival time for a $(k-1)^{th}$ cell, namely $t_a(k-1)[n-1]$, is one; means for setting TAT equal to $t_a(k)$ if either of the tests are true; and means for determining if TAT is greater than $t_a(k)+L$, where L is a limit value for cell time of arrival variation, if all of the tests are not true. The processor further includes means for identifying a cell non-conforming if TAT is greater than $t_a(k)+L$, and means for incrementing TAT by a numeric value I and identifying a cell conforming if TAT is less than or equal to $t_a(k)+L$ or if either of the earlier tests between TAT and $t_a(k)$ are true. The traffic control device disclosed provides a useful mechanism for identifying conforming and non-conforming cells on a periodic basis where there is low cell delay variation.

Associated with the problem of determining compliance is the need, particularly in high-speed AT-based networks where line rates may exceed 800 Mbps, for a traffic control system adaptive to high cell delay variation tolerances and which is capable of continuous monitoring and tracking boundary conditions in a finite word length architecture so as to provide greater precision in identifying conforming and non-conforming cells.

Accordingly, it is an object of the invention to provide apparatus and method for traffic control in a cell-based network which fulfills the above needs in the art and which avoids false identifications of non-conforming and conforming cells.

SUMMARY OF THE INVENTION

Broadly speaking, the present invention contemplates a method of determining compliance and non-compliance of arriving cells in a cell-based network. In the method provided, compliance of an arriving cell k, having a time of arrival $t_a(k)$, is based on a traffic contract, agreed-upon between a user and the network, and a theoretical arrival time (TAT) wherein TAT has an initial value equal to the time of arrival of a first cell $t_a(1)$. The traffic contract includes the limit parameter L agreed upon between the user and the network.

In this method of determining compliance and non-compliance of arriving cells, $t_a(k)$ for an arriving cell k is measured. TAT is then compared with $t_a(k)$ while adjusting for rollovers in $t_a(k)$ If TAT is determined to be less than $t_a(k)$, the arriving cell k is declared conforming and TAT is updated. In the event TAT is not less than $t_a(k)$, TAT is compared with $t_a(k)+L$ while adjusting for rollovers in $t_a(k)$ If in the second comparison TAT is determined to be less than or equal to $t_a(k)+L$, the arriving cell k is declared conforming and TAT is updated, otherwise the cell is declared non-conforming.

The traffic contract preferably includes limit parameter L and increment parameter I. In one embodiment, L represents a cell delay variation and I represents the inverse of a peak cell rate. In another embodiment, L represents a burst tolerance and I represents the inverse of a sustainable cell rate. Updating TAT in the event TAT is determined to be less than $t_a(k)$ can include setting TAT equal to $t_a(k)+I$ and storing TAT in an n-bit counter for TAT. In the event TAT is determined to be less than or equal to $t_a(k)+L$, updating TAT can include incrementing TAT by I and storing TAT in an n-bit word-length counter. The method can also include tracking $t_a(k)$ for rollovers which can include determining if an n-bit counter for $t_a(k)$ has rolled over. The method can further include compensating for long inter-cell arrival times.

As a further embodiment, the present invention contemplates a method of determining compliance and non-compliance of arriving cells wherein comparisons between TAT and $t_a(k)$, and TAT and $t_a(k)+L$, are made while adjusting for rollovers in $t_a(k)$ and TAT. In this latter embodiment, updating TAT can include saturating TAT if a double rollover of TAT has occurred and storing TAT in an n-bit counter. The method can also include tracking $t_a(k)$ and TAT for rollovers which may include determining if an n-bit counter for $t_a(k)$ and an n-bit counter for TAT have rolled over. Tracking may include a flag for tracking a most significant bit of the n-bit counter for $t_a(k)$ and a rollover flag for tracking TAT.

In another embodiment, the method comprises measuring a time of arrival $t_a(k)$ for a cell k, computing finite values for TAT, $t_a(k)$ and $t_a(k)+L$, including adjusting for rollovers of $t_a(k)$ and TAT, and storing the finite values for TAT, $t_a(k)$ and $t_a(k)+L$ in finite word-length counters for TAT, $t_a(k)$ and $t_a(k)+L$, respectively. In this embodiment there is included testing if the finite counter for TAT is less than or equal to the finite counter for $t_a(k)$, and if a result of "yes" is produced, declaring the cell conforming and updating TAT. In the event the finite counter for TAT is not less than or equal to the finite counter for $t_a(k)$, the method includes testing if the finite counter for TAT is less than or equal to the finite value for $t_a(k)+L$, and if a result of "yes" is produced, declaring the cell conforming and updating TAT. In the event the finite counter for TAT is not less than or equal to the finite counter for $t_a(k)+L$, the cell is declared non-conforming. The method can include n-bit word-length counters for TAT and $t_a(k)$, a rollover flag for TAT (rollover_tat) and a rollover flag for $t_a(k)$ (rollover_ta), wherein computing finite values for TAT, $t_a(k)$ and $t_a(k)+L$ may include: (i) concatenating the rollover flag for TAT to a most significant bit of the n-bit counter for TAT to produce a first result and storing the first result in the finite counter for TAT; (ii) concatenating rollover flag for $t_a(k)$ to a most significant bit of the n-bit counter for $t_a(k)$ to produce a second result and storing the second result in the finite counter for $t_a(k)$; and (iii) setting the finite counter for $t_a(k)+L$ equal to L+the finite counter for $t_a(k)$.

The present invention also contemplates a system for determining compliance of arriving cells in a network based on a traffic contract, agreed-upon between a user and the network, and a theoretical arrival time (TAT), wherein TAT has an initial value equal to the time of arrival of a first cell $t_a(1)$, the network includes a source of clock pulses and a source of cell arrival signals, and the traffic contract includes limit parameter L. The system comprises an n-bit time of arrival counter having an input coupled to the source of clock pulses, a parallel n-bit gate having a first input coupled to said n-bit time of arrival counter and a second input coupled to the source of cell arrival signals, and a processor having an input coupled to said gate.

The processor includes comparing and declaring means for: (aa) comparing TAT with $t_a(k)$ while adjusting for rollovers in $t_a(k)$ and TAT and, if TAT is less than or equal to $t_a(k)$, declaring the cell conforming and updating TAT; (bb) comparing TAT with $t_a(k)+L$ while adjusting for rollovers in $t_a(k)$ and TAT and, if TAT is less than or equal to $t_a(k)+L$, declaring the cell conforming and updating TAT; and (cc) declaring the cell non-conforming. The processor can include means for saturating TAT if a double rollover of TAT occurs in either of conditions (aa) and (bb). Comparing and declaring means may include means for setting TAT equal to $t_a(k)+I$, saturating TAT if a double rollover of TAT is detected, and storing TAT in the n-bit counter for TAT in (aa); and means for incrementing TAT by I, saturating TAT if a double rollover of TAT is detected and storing TAT in the n-bit counter for TAT in (bb). In this embodiment, the system may further include means for determining if the n-bit counters for $t_a(k)$ and TAT have rolled over.

As envisioned within the scope of this invention, the system may further include means for compensating for long inter-cell arrival times. The system may further include in the processor a flag to track a most significant bit of the n-bit counter for $t_a(k)$ and a rollover flag for tracking TAT. Where the system tracks TAT and $t_a(k)$ for rollovers, the means for compensating for long inter-cell arrival times can include means for updating TAT and rollover flags for TAT and $t_a(k)$ on a periodic boundary. The system may also include a memory unit, coupled to the processor, operative to store values of TAT, $t_a(k)$, and L.

In another embodiment of the system envisioned within the scope of this invention, the processor comprises (i) an n-bit word-length counter for each of $t_a(k)$ and TAT; (ii) means for determining if the n-bit word-length counters for $t_a(k)$ and TAT have rolled over; (iii) means for computing finite values for TAT, $t_a(k)$ and $t_a(k)+L$, including adjusting for rollovers detected in (ii), and storing the finite values in finite m-bit counters for TAT and $t_a(k)$, and an r-bit counter for $t_a(k)+L$, respectively, where m and r are greater than n; (iv) means for (aa) testing if the finite counter for TAT is less than or equal to the finite counter for $t_a(k)$, and (bb) testing if the finite counter for TAT is less than or equal to the finite counter for $t_a(k)+L$; (v) means for updating TAT, detecting rollovers and double rollovers of TAT and declaring the cell conforming if either of conditions (aa) and (bb) in (iv) is true; and (vi) means for declaring the cell non-conforming if all conditions in (iv) are false.

In one embodiment of the traffic control system, there is provided an update flag and an update signal generator, coupled to the processor, operative to transmit update signals to set the update flag and operative to receive reset signals from the processor for resetting the update flag, and a user setable clock coupled to the update signal generator operative to send clock signals to the update signal generator.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
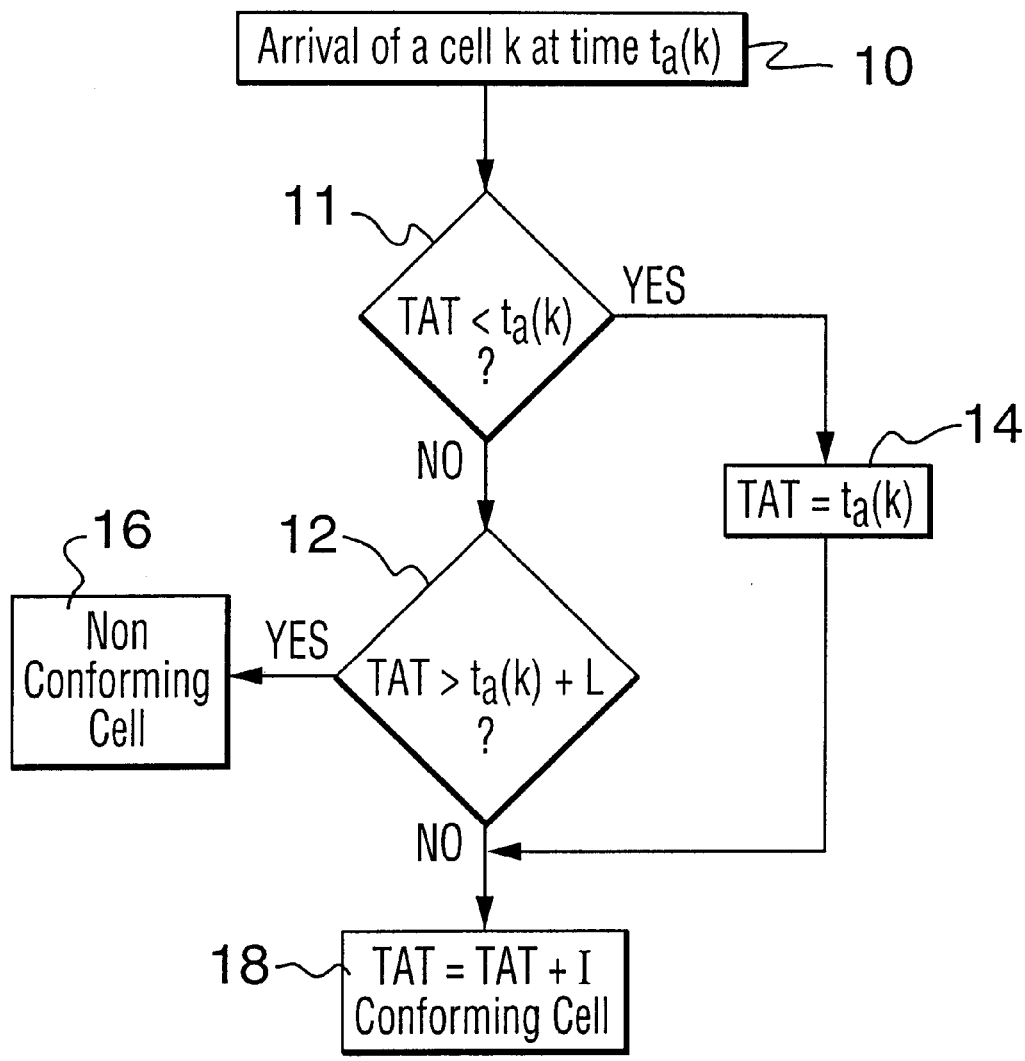
FIG. 1 is a decision tree corresponding to a virtual scheduling algorithm.

Referring to FIG. 1, the virtual scheduling algorithm implementation of the GCRA tests the time-of-arrival of a $k^{th}$ cell which is denoted as $t_a(k)$ The time-of-arrival $t_a(k)$ is compared to a theoretical arrival time (TAT) parameter at step 11. The theoretical arrival time TAT represents an expected arrival time of a cell.

Initially, at the arrival time of a first cell $t_a(1)$, the theoretical arrival time TAT is updated to the current arrival time, $t_a(1)$. For subsequent cells, if the arrival time of the $k^{th}$ cell, $t_a(k)$, is later than the current value of TAT, then the cell is determined to be conforming and TAT is updated to the current arrival time, $t_a(k)$ at step 14 and has an increment I added at step 18. Typically, the increment I determines the acceptable rate of cell arrivals, and represents the inverse of the peak cell rate (PCR). The PCR defines an agreed-upon upper bound on the traffic that can be submitted on an ATM connection under a traffic contract. The inverse of the PCR represents the minimum inter-cell arrival time between two consecutive cells. In one alternative, increment I may refer to the inverse of the sustainable cell rate, where the sustainable cell rate (SCR) is defined as an upper bound on the average rate of an ATM connection, calculated over the duration of the connection.

If the arrival time, $t_a(k)$, of the $k^{th}$ cell is determined to be less than or equal to TAT at step 11 but is determined to be greater than or equal to TAT–L at step 12, then the cell is deemed to be conforming to the GCRA and the TAT is incremented by I at step 18. Limit parameter L is typically defined as the cell delay variation (CDV). The CDV forms part of the traffic contract for an ATM connection and defines an agreed-upon upper bound on the variability in the pattern of cell arrivals observed at a single measurement point with reference to the PCR. If $t_a(k)$ is determined to be less than TAT–L at step 12 then the cell is non-conforming as established at step 16 and TAT is unchanged.

Figure 2:
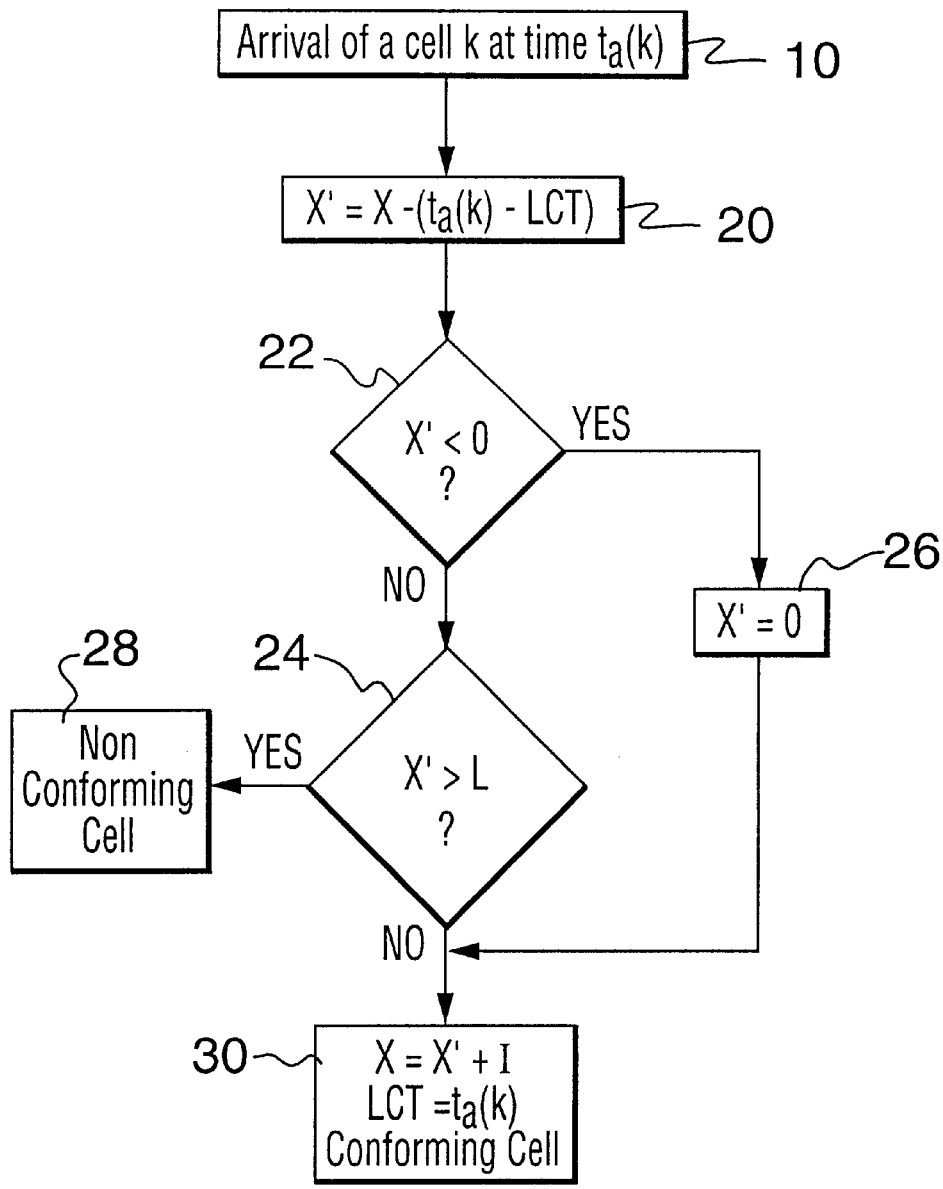
FIG. 2 is a decision tree corresponding to a leaky bucket algorithm.

An alternative but equivalent algorithm, known as the continuous-state leaky bucket algorithm, is shown in FIG. 2. In this case, the contents of the bucket, X, is set to zero on the arrival of the first cell $t_a(1)$ and a parameter known as the last conformance time (LCT) is set to $t_a(1)$. At the arrival time of a $k^{th}$ cell, $t_a(k)$, the content of the bucket is provisionally updated to X' at step 20, which equals the content of the bucket, X, after the arrival of the last conforming cell minus the among the bucket has drained since that arrival, where the content of the bucket is constrained to be non-negative. The amount of drainage is equal to the arrival time, $t_a(k)$ less the last conformance time LCT. Low values of $t_a(k)$ (or higher rates of arrival of pulses) relative to the LCT cause the bucket to fill and conversely high values of $t_a(k)$ relative to the LCT cause the bucket to empty. If at step 22, the value of X' is less than zero, it is set to zero at step 26, and X is incremented by I at step 30 where LCT is set equal to $t_a(k)$. If X' is greater or equal to zero then at step 24 it is checked to see whether or not it is greater than a limit parameter, L. If it is greater than L, it is declared non-conforming at step 28. If it is not greater than L, the system goes to step 30 and X' is incremented at step 30 by I where LCT is set equal to $t_a(k)$.

Figure 3:
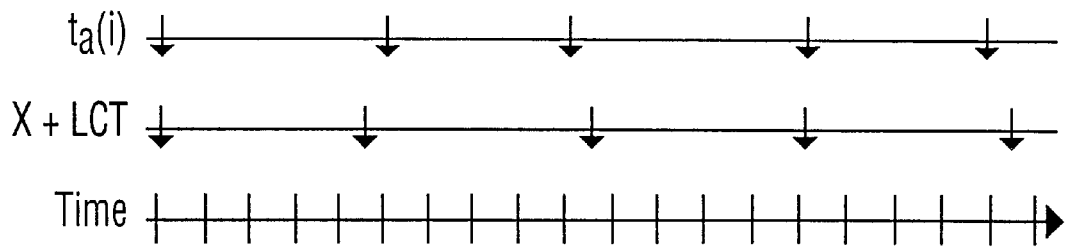
FIG. 3 is a schematic diagram of cell arrival times for a limit parameter L, of 0.5 times $\delta$, the time of one send cell.
Figure 4:
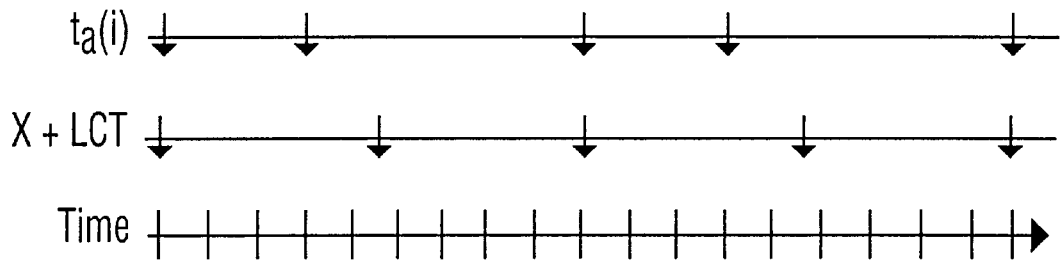
FIG. 4 is a schematic diagram of cell arrival times for a limit parameter L, of 1.5 times $\delta$.
Figure 5:
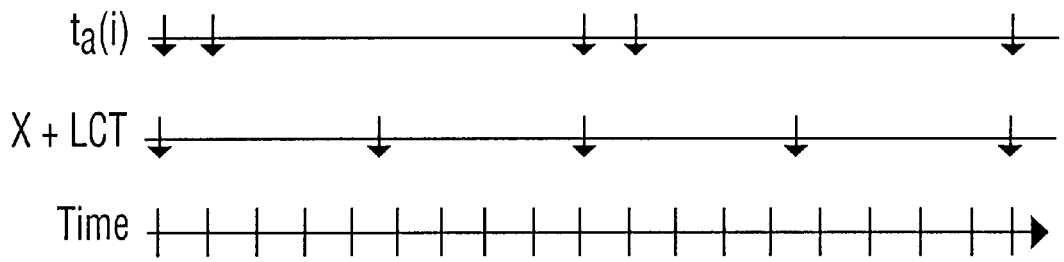
FIG. 5 is a schematic diagram of cell arrival times for a limit parameter L, of 3.5 times $\delta$.

For either algorithm, a smaller value for L results in less tolerance for variations in cell arrival times. In FIGS. 3, 4 and 5 examples of cell arrival times are shown for various values of the limit parameter L, as a function of the time, $\delta$, on an ATM-based network having a line rate of 150 Mbps. The measurements shown are for ATM Protocol Data Units (PDUs) having 53 octets (1 cell). The vertical arrows indicate the arrival of a cell across the UNI. For L=0.5$\delta$, the variations of arrival times from the incremented values of TAT are relatively small, resulting in smooth traffic flows. For L=3.5$\delta$, the variations are much larger with cell clumping, resulting in bursty traffic flows.

In any implementation of a cell policing system, it is important to ensure that, apart from conforming to the standards set by ITU-I.371, no compliant cells are ever identified as non-compliant and that the system can perform this logic at line rates as high as or higher than 622 Mbps. Because any hardware system for keeping track of time requires some type of counter(s), a problem exists whenever the counter(s) rolls over, in that the next time-value will be close to zero and much less than the previous time-value and the first cell to arrive after a "rollover" will be declared non-conforming even if it is conforming.

In order to make a hardware realizable cell rate policing algorithm as envisioned in this invention, the time-of-arrival counter $t_a(k)$, for a cell k, is implemented as a finite word-length counter. The parameters for TAT, I and L are also implemented as finite word-length counters. Since finite word-length counters for $t_a(k)$ and TAT must be used, rollover of these counters constitutes a boundary condition which needs to be resolved. In the preferred embodiment of the present application, TAT and $t_a(k)$ are n-bit word-length fields where TAT[n−1:0] represents the bitwise field for TAT and $t_a(k)$ [n−1:0] represents the bitwise field for $t_a(k)$.

A rollover of the $t_a(k)$ counter will occur every $(2^n-1)*dt$, where dt is the time-quantum at which the policing processor is clocked and n is the bit length of the counter provided. For example, with a 32-bit word-length (n=32), and a policing processor clocked at 100 MHz (dt=10e−9 sec), the rollover period of the $t_a(k)$ counter will be $(2^{32}-1)*(10e-9)=42.9$ sec. In contrast, the TAT field can rollover whenever the calculations of TAT+I, or $t_a(k)$+I exceed the maximum finite value available for the theoretical arrival time ($TAT_{max}$) where $TAT_{max}=2^n-1$. As a result, the ability of a traffic control device to avoid false identifications is susceptible to error arising from rollovers in both TAT[n−1:0] and $t_a(k)$[n−1:0].

Figure 6:
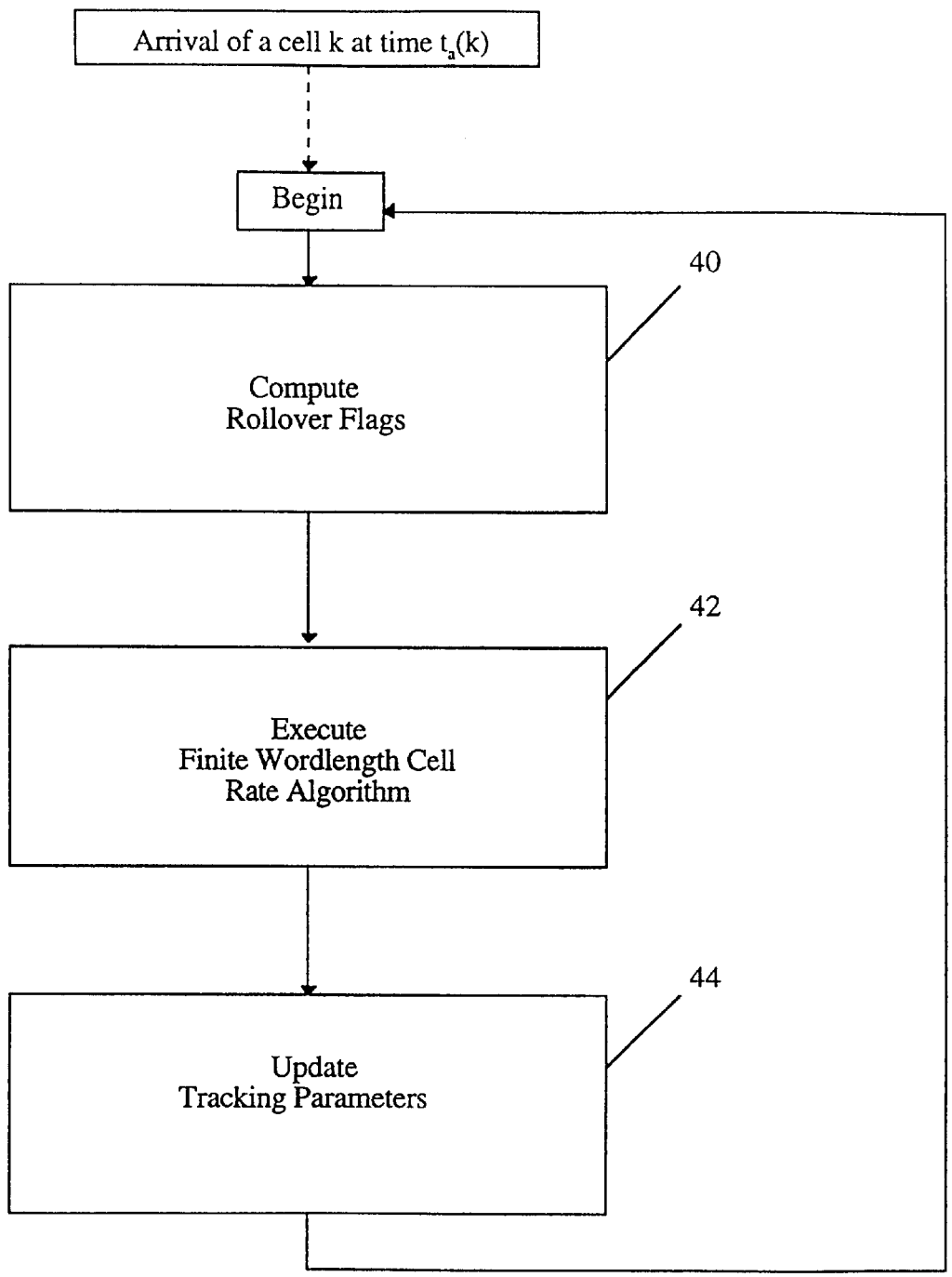
FIG. 6 is a flowchart illustrating a method of traffic control as envisioned herein.

Referring to FIG. 6, a method of traffic control as envisioned in this invention is shown wherein rollover flags for the TAT field and the $t_a(k)$ field are computed and stored by a policing processor. The rollover flags for TAT and $t_a(k)$ are referred to as rollover_tat and rollover_ta, respectively. The rollover_ta flag need not necessarily be stored, as it can be computed each time the policing processor is exercised. In order to do this, however, the most significant bit (MSB) of $t_a(k)$ must be stored each time the policing processor is invoked for use in the evaluation of the succeeding cell. In the preferred embodiment, the MSB of $t_a(k)$ is stored in a counter referred to here as old_ta_msb. When an ATM connection is established, old_ta_msb, rollover_ta and rollover_tat are cleared (i.e. set to 0).

Figure 7:
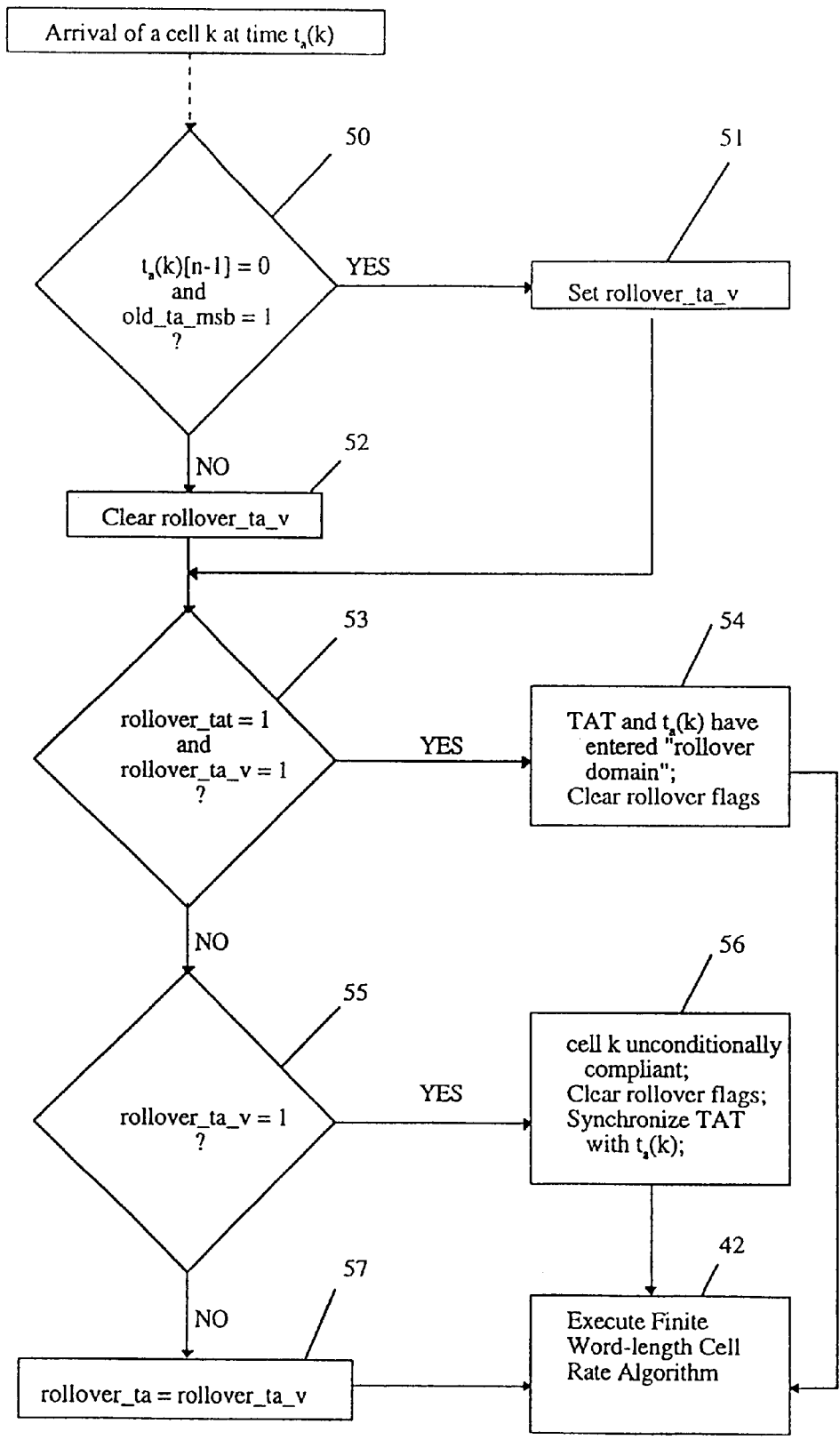
FIG. 7 is a flowchart illustrating a method of computing rollovers as part of the method illustrated in FIG. 6.
Figure 8:
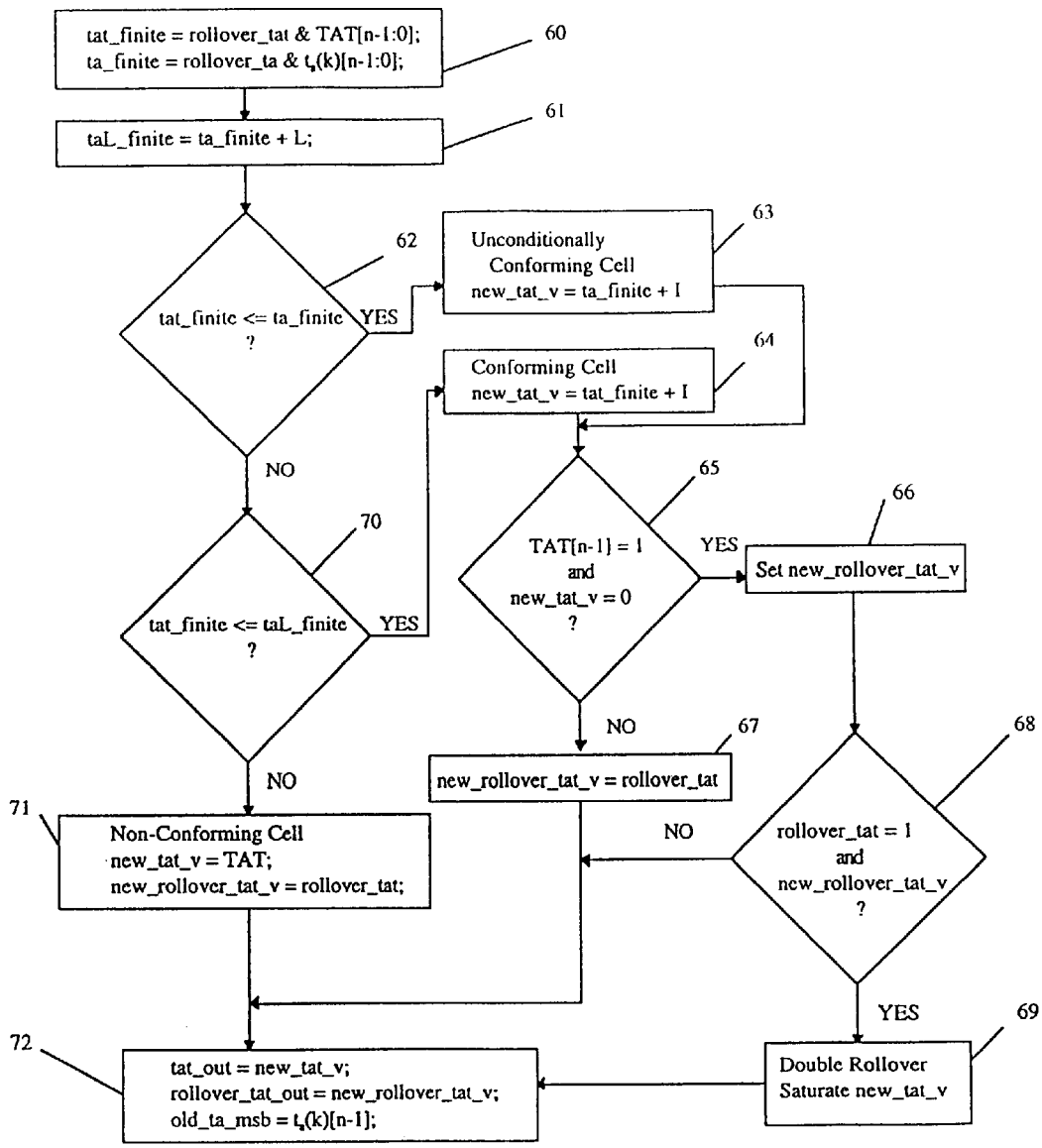
FIG. 8 is a flowchart illustrating a method of executing a finite word-length cell rate algorithm and of updating tracking parameters.

When a cell k is received on an ATM connection, the time of arrival $t_a(k)$ is measured and transmitted to the processor described below (see FIG. 11). The rollover parameters for TAT and $t_a(k)$ are computed at step 40 to determine if either or both parameters have exceeded upper boundary conditions and entered a "rollover domain". A finite word-length cell rate algorithm is then executed at step 42, followed by updating at step 44 the n-bit fields for TAT and $t_a(k)$, and the rollover flag for TAT. The details of the modified traffic control algorithm are shown in FIGS. 7 and 8. As shown in FIG. 8, steps 42 and 44 of FIG. 7 are preferably implemented in combination.

Referring to FIG. 7, the computation of rollover parameters by the processor at step 40 (in FIG. 6) involves first determining if the most significant bit of the n-bit counter for the arrival time of cell k ($t_a(k)$[n−1]) differs from the most significant bit of the n-bit field for the arrival time of the previous cell (referred to here as old_ta_msb) at step 50. If $t_a(k)$ [n−1]=0 and old_ta_msb=1, as computed by the processor, then the n-bit counter for $t_a(k)$ has rolled over its upper boundary limit in which case a temporary rollover flag, rollover_ta_v, is set (i.e. set equal to 1) at step 51. Where the processor determines at step 50 that the n-bit counter for $t_a(k)$ has not rolled over, rollover_ta_v is cleared (set equal to 0) at step 52. Following either step 51 or 52, the processor determines at step 53 if both rollover_tat and rollover_ta_v have been set to evaluate if the n-bit counters for TAT and $t_a(k)$ have both exceeded their upper boundary for the current cell k. If the processor finds that the flags rollover_tat and rollover_ta_v are set, then both TAT and $t_a(k)$ have entered the same "rollover domain" (both counters have rolled over for the current cell) and policing by the processor for the current cell can and preferably should be suppressed by clearing (setting equal to 0) rollover_tat and rollover_ta_v, and retaining the previous value of TAT at step 54. If the result of the test at step 53 is "no", the rollover flags are preferably further tested at step 55 to determine if rollover_ta_v has been set (i.e. equals 1). Where the processor determines at step 55 that rollover_ta_v has been set, the n-bit field for $t_a(k)$ has rolled over, while TAT has not rolled over. In such a case, the received cell is "unconditionally compliant", in other words, the actual time of arrival (accounting for the rollover of the n-bit counter for $t_a(k)$) is greater than the current theoretical arrival time (i.e. TAT<$t_a(k)$), and the received cell is conforming. Although the received cell is in fact unconditionally compliant, execution of the policing algorithm on the n-bit counter for $t_a(k)$ which has rolled over would result in a false identification of the current cell as non-conforming. Accordingly, policing should be suppressed by clearing rollover flags rollover_tat and rollover_ta (if the method is implemented with rollover_ta) and synchronizing TAT to the value of $t_a(k)$ (i.e. TAT=$t_a(k)$) at step 56. In the event that the test at step 56 fails, the processor assigns the value of rollover_ta_v to rollover_ta (where implemented) and rollover_tat is asserted at step 57. It should be noted that if only the n-bit counter for TAT has not rolled over, as can arise in step 57, rollover_tat preferably should not be cleared.

An alternative exemplary description of the computation of rollovers set forth in FIG. 7 is provided in TABLE 1 which follows. TABLE 1 describes the computation of rollovers according to the conventions of the well known VHDL hardware description language.

TABLE 1

Compute Rollovers

```
rollover:    process(ta, old_ta_msb, rollover_tat)
             variable rollover_ta_v : std_logic;
begin
             if (ta(n-1) = '0' and old_ta_msb = '1') then
                 rollover_ta_v := '1';
             else
                 rollover_ta_v:= '0';
             end if;
             if (rollover_tat = '1' and rollover_ta_v = '1') then
             -- Both tat and ta have entered the
             -- "rollover domain"
                 rollover_tat <= '0';
                 rollover_ta <= '0';
                 tat <= tat;
             elsif (rollover_ta_v = '1' and rollover_tat = '0') then
             -- ta has rolled over, but tat has not rolled over.
             -- the cell is unconditionally compliant.
                 rollover_tat <= '0';
                 rollover_ta <= '0';
                 tat <= ta;
             else
                 rollover_tat <= rollover_tat;
                 rollover_ta <= rollover_ta_v;
             end if;
end process rollover;
```

Referring to FIG. 8, once computation of the rollover flags, rollover_tat and rollover_ta, is complete, a finite word-length cell rate policing algorithm is executed. At step 60 the 1-bit field (preferably) for rollover_tat is concatenated to the head of the n-bit field TAT[n−1:0] and the result is preferably assigned to an extended n+1 bitlength counter tat_finite (i.e. tat_finite=rollover_tat & TAT[n−1:0]). The most significant bit of the resulting tat_finite counter contains the value of rollover_tat. Also at step 60, the value for rollover_ta is concatenated to the head of the n-bit field $t_a(k)$ [n−1:0] and the result is preferably assigned to the extended n+1 bit counter ta_finite (i.e. ta_finite= rollover_ta & $t_a(k)$[n−1:0]). At step 61, the processor adds the value for the limit parameter L (which is typically the CDV defined by the traffic contract) to the value of ta_finite and assigns the result preferably to an n+2 bit counter, taL_finite. Note that tat_finite, ta_finite and taL_finite are temporary storage counters used by the processor to store the finite values of TAT, $t_a(k)$ and $t_a(k)$+L.

Once steps 60 and 61 are complete, the values of tat_ finite and ta_finite are then compared at step 62. If tat_ finite is determined to be less than or equal to ta_finite, then the received cell is unconditionally compliant and the new value for TAT is computed by the processor based on the sum of ta_finite and I, the result of which is stored in a temporary counter new_tat_v at step 63. The MSB of the existing value of TAT and the new value for TAT, new_ tat_v, are then tested at step 65 to determine if a rollover has occurred for the new value of TAT. If the MSB of TAT is 1 and the MSB of new_tat_v is 0, then a rollover has occurred and an additional flag, new_rollover_tat_v, is asserted (set equal to 1) at step 66. Following step 66, rollover_tat and new_rollover_tat_v are both tested at step 68. If the processor determines that both rollover_tat and new_rollover_tat_v have been set (i.e. equal to 1), then a double rollover condition exists, and new_tat_v is "saturated" at step 69. "Saturating" is referred to here as setting all bits in an n-bit counter equal to 1. Following step 69 or a result of "no" from step 68, processing proceeds to step 72. In the event that the result of step 65 is "no", the value of rollover_tat is assigned to new_rollover_tat_v at step 67 and processing then proceeds to step 72.

If the test in step 62 fails, the processor compares tat_ finite and taL_finite at step 70. If tat_finite is determined by the processor to be less than or equal to taL_finite at step 70, then the received cell is compliant to the traffic contract agreed upon between the user and the network within the cell delay variation parameter L and the processor assigns the value of tat_finite+L to new_tat_v at step 64. Processing then proceeds to step 64 as discussed earlier to test for rollovers of TAT and new_tat_v.

In the event the test at step 70 fails, the received cell is non-conforming, in which case the existing value for TAT is assigned to new_tat_v and the value of rollover_tat is assigned to new_rollover_tat_v at step 71. Where step 71 is executed, the parameters for TAT, old_tat_msb and rollover_tat are not updated. Processing then proceeds to step 72.

At step 72, the processor stores the values for new_tat_v, new_rollover_tat_v and the most significant bit of $t_a(k)$ in tat_out, rollover_tat_out and old_ta_msb, respectively, for use in processing the next arriving cell. A cell which is identified as conforming is passed through the ATM connection and permitted into the network. Preferably, a cell which is identified as non-conforming is discarded by the network when network performance objectives and QOS for other connected users are in danger of not being met. Upon identifying a cell as conforming or non-conforming, the processor prepares to evaluate the next arriving cell.

Use of the rollover flags, rollover_tat and rollover_ta, means that the relative rollovers of TAT and $t_a(k)$, may be tracked by the finite word-length cell rate algorithm in FIGS. 7 and 8, allowing for continuous monitoring of traffic flows and permitting for greater cell delay variation tolerance.

An alternative exemplary description of the finite cell rate algorithm in FIG. 8 is set forth in TABLE 2 using VHDL hardware description language. As indicated in TABLE 2, upon completion of execution of the finite cell rate method and updating of tracking parameters, new values for TAT (new_tat_v), the rollover flag for TAT (new_rollover_ tat_v) and $t_a(k)$[n−1] ($t_a(n-1)$), are stored in tat_out, rollover_tat_out and old_ta_msb, respectively, for use in evaluating the next arriving cell.

TABLE 2

Execute Finite Wordlength Cell Rate Algorithm
and Update Tracking Parameters

```
fcra: process (ta, rollover_ta, rollover_tat, tat, L, I)
        variable new_tat_v : std_logic_vector(n+2 downto 0);
        variable new_rollover_tat_v : std_logic;
begin
        tat_finite(n downto 0) <= rollover_tat & tat(n−1 downto 0);
        ta_finite(n downto 0) <= rollover_ta & ta(n−1 downto 0);
        taL_finite(n+1 downto 0) <= ta_finite + L(n−1 downto 0);
        if (tat_finite <= ta_finite) then
        -- Cell is unconditionally compliant.
                new_tat_v := ta_finite + I;
        if (tat(n−1) = '1' and new_tat_v(n−1) = '0') then
        -- Rollover has occurred.
                new_rollover_tat_v := '1';
                if(rollover_tat='1' and new_rollover_tat_v='1') then
                -- Double rollover, therefore,
                -- saturate new_tat_v.
                        new_tat_v := (others => '1';
                end if;
        else
                new_rollover_tat_v := rollover_tat;
        end if;
        elsif (tat_finite <= taL_finite) then
        -- Cell is compliant within the cell delay variation, L
                new_tat_v := tat_finite + I
        if (tat(n−1) = '1' and new_tat_v(n−1) = '0') then
        -- Rollover has occurred.
                new_rollover_tat_v := '1';
                if(rollover_tat='1' and new_rollover_tat_v='1') then
                -- Double rollover, therefore,
                -- saturate new_tat_v.
                        new_tat_v := (others => '1');
                end if;
        else
                new_rollover_tat_v := rollover_tat;
        end if;
        else
        -- The cell is non-compliant; do not update parameters.
                new_tat_v := tat;
                new_rollover_tat_v := rollover_tat;
        end if;
        -- Now, these are the updated data which are stored.
        tat_out <= new_tat_v;
        rollover_tat_out <= new_rollover_tat_v;
        old_ta_msb <= ta(n−1);
end process fcra;
```

Figure 9:
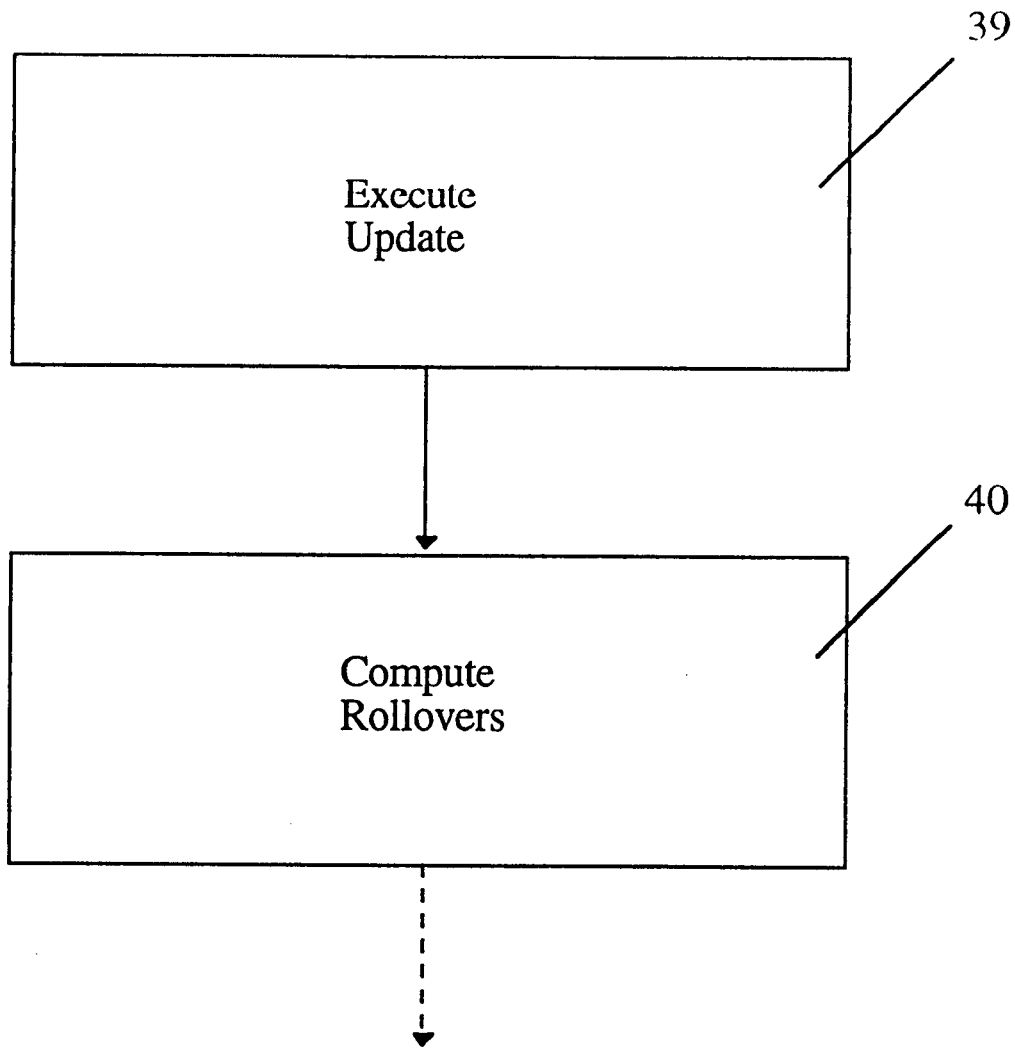
FIG. 9 is a flowchart illustrating an alternative embodiment of the method in FIG. 6 including updating for long inter-cell delays.
Figure 10:
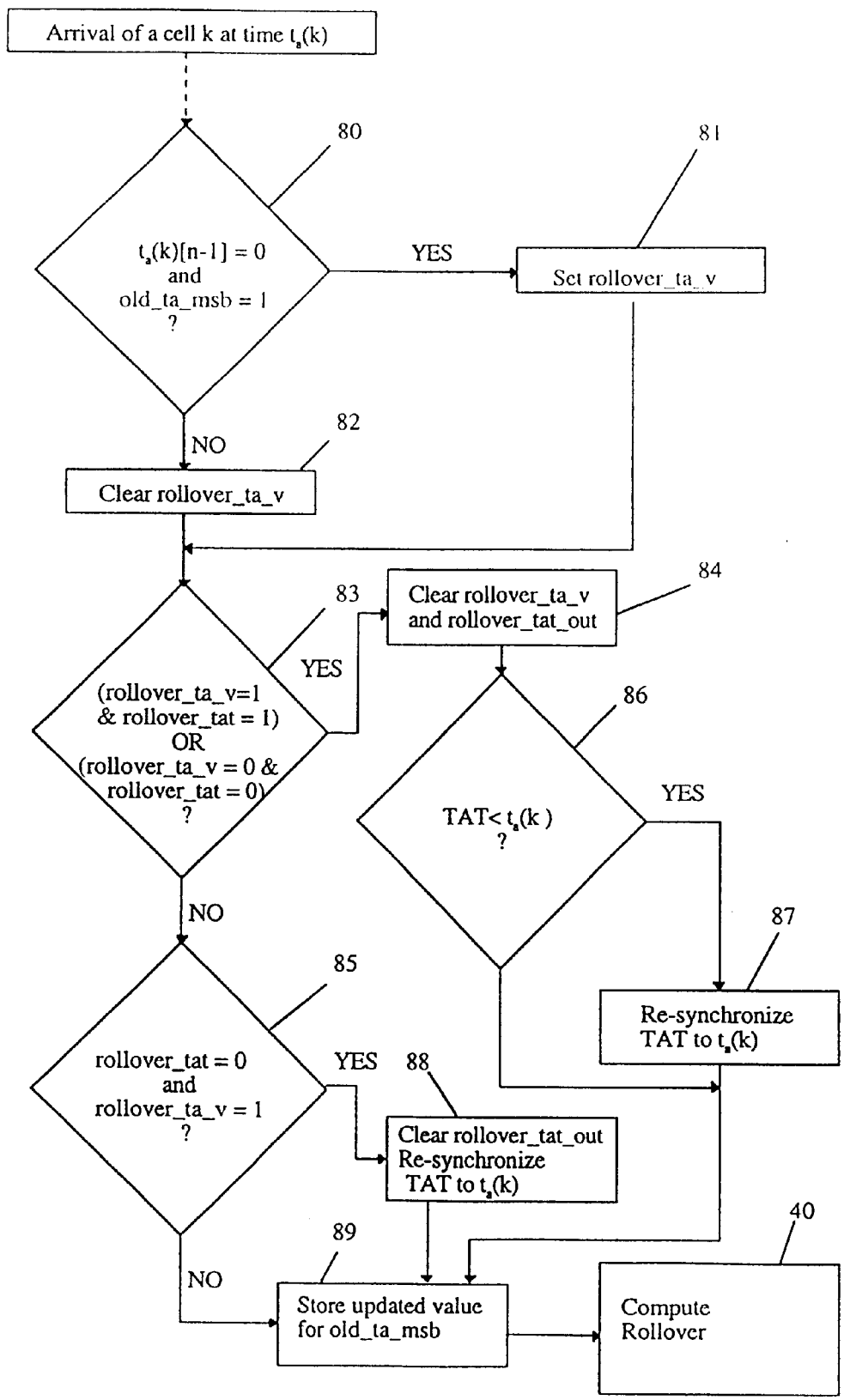
FIG. 10 is a flowchart illustrating the steps of FIG. 9.

Referring to FIGS. 9 and 10, in order to compensate for potentially long inter-cell arrival times, an update algorithm 39 is shown in a preferable embodiment which is implemented before step 40 and is compatible with the traffic control method described above. Using the update algorithm ensures that where an ATM connection is characterized by long inter-cell delays, the rollover of the time of arrival counter is never missed, and provides that TAT, rollover_tat and old_ta_msb parameters are updated on a periodic boundary. For n-bit word-length counters, the update should occur at least once every $(2^{n-1})*(dt)$ time intervals, where dt is the time quantum used to clock the policing processor. The update algorithm refreshes the TAT parameter, old_ta_msb and the rollover flags for ATM connections on which traffic control is active.

As shown in FIG. 10, if at step 80 the most significant bit of the time of arrival for the last received cell, old_ta_msb, is 1 and the most significant bit of $t_a(k)$, referred to as $t_a(k)[n-1]$, for the current cell is 0, then rollover flag rollover_ta_v is set (rollover_ta_v=1) at step 81. Otherwise, the rollover flag rollover_ta_v is cleared at step 82. At step 83, the rollover flags for rollover_tat and rollover_ta_v are then tested. If the processor determines that rollover_tat=1 and rollover_ta_v=1, or rollover_tat=0 and rollover_ta_v=0, then both TAT and $t_a(k)$ are in the same rollover domain. In the event the testing at step 83 produces a result of "yes", rollover_ta_v and output flag rollover_tat_out are cleared at step 84. TAT is then compared to $t_a(k)$ step 86 and in the event TAT is less than $t_a(k)$, TAT is re-synchronized with $t_a(k)$ at step 87, otherwise TAT is passed to output variable tat_out. In the event that the result of either test at step 83 is "no", the rollover flags for rollover_tat and rollover_ta_v are tested at step 85. Where it is determined at step 85 that TAT has not rolled over and $t_a(k)$ has rolled over, TAT is less than $t_a(k)$. Accordingly, rollover_tat_out can be cleared and TAT re-synchronized to equal $t_a(k)$ at step 88. If the result of the test in step 85 is "no", the current values for TAT and rollover_tat are passed to tat_out and rollover_tat_out, respectively, and processing proceeds to step 89. At step 89 old_ta_msb is updated to store the value of $t_a(k)$ [n-1]. Following completion of the update block, the updated values for TAT, $t_a(k)$, rollover_tat and old_ta_msb are passed to step 40 for further processing as previously discussed.

An equivalent hardware description of periodic updating for long inter-cell delays is set forth in TABLE 3 using VHDL.

TABLE 3

Figure 11:
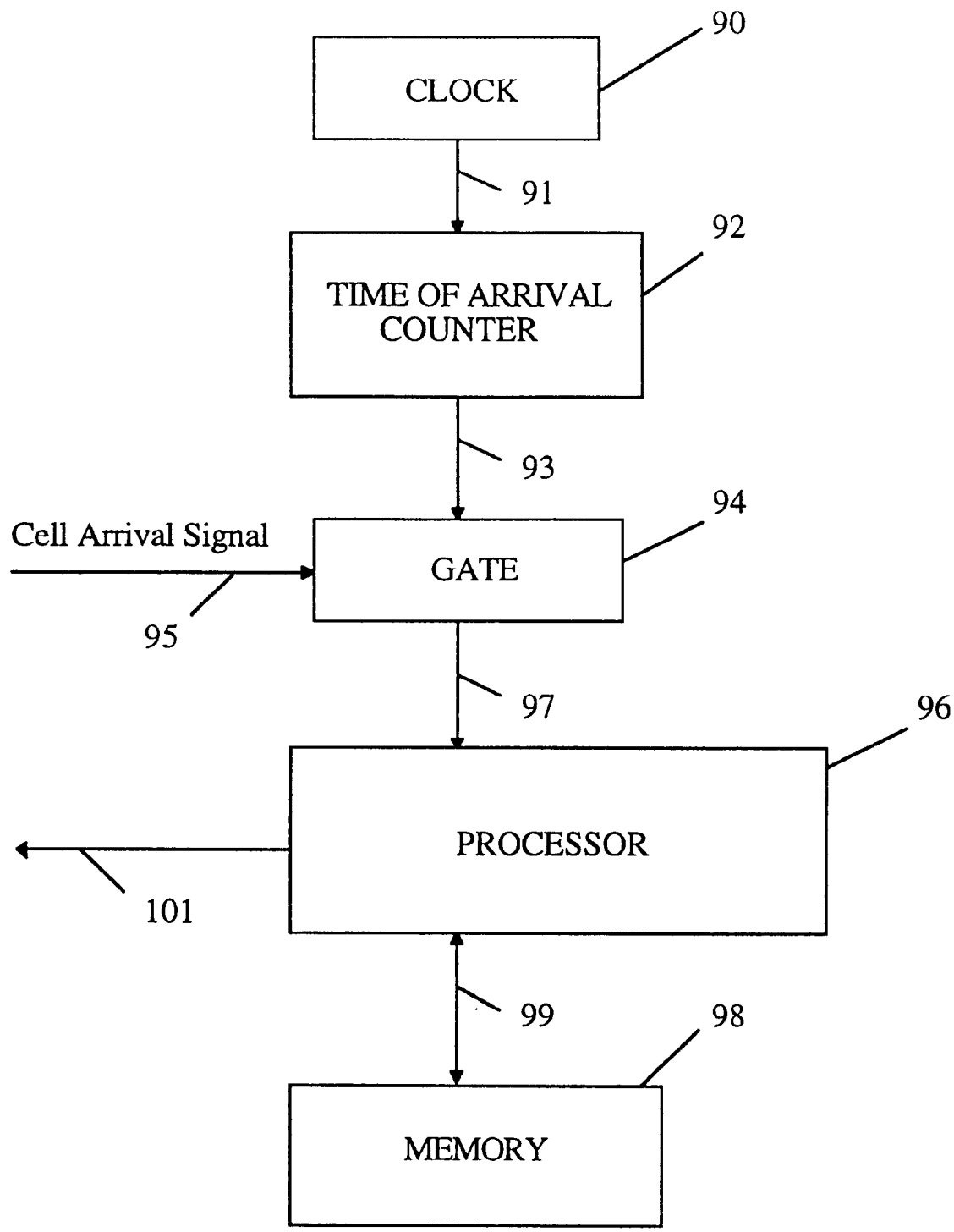
FIG. 11 is a schematic diagram of one embodiment of the traffic control system envisioned in this invention.

Execute Periodic Update periodic_update: process (ta, tat, rollover_tat, old_ta_msb)
    variable rollover_ta_v : std_logic;
begin
    if (old_ta_msb = '1' and ta(n-1) = '0') then
        -- Compare the previous time-of-arrival MSB
        -- and the current time-of-arrival MSB.
        rollover_ta_v := '1';
    else
        rollover_ta_v := '0';
    end if;
    if ((rollover_ta_v = '1' and rollover_tat = '1') OR
    (rollover_ta_v = '0' and rollover_tat = '0')) then
        Both TAT and ta are in the same rollover domain
        rollover_ta_v := '0';
        rollover_tat_out <= '0';
        if (tat < ta) then
            tat_out <= ta;
        else
            tat_out <= tat;
        end it;
    elsif (rollover_tat = '0' and rollover_ta_v = '1') then
        -- ta has rolled over, and TAT has not rolled over.
        -- Therefore, we can re-synchronize TAT.
        -- i.e. the next cell will be unconditionally compliant.
        tat_out <= ta
        rollover_tat_out <= '0';
    else
        -- Do not update TAT.
        tat_out <= tat;
        rollover_tat_out <= rollover_tat;
    end if;
    -- Store the "new" previous time-of-arrival MSB.
    old_ta_msb <= ta(n-1);
end process periodic_update;

Referring to FIG. 11, a system is shown for tracking and monitoring cell traffic which implements the finite word-length traffic control method described above to identify conforming and non-conforming cells. The system comprises a finite n-bit word-length (preferably) time of arrival counter 92 having a clock input 91 and an n-bit parallel output on bus 93 to gate 94. The n-bit parallel output from gate 94 goes to an input of an n-bit processor 96, in response to a cell arrival signal on line 95. Preferably, processor 96 is programmable and communicates with memory unit 98 (preferably RAM). Typically, processor 96 will be 16 or 32 bit and will have a clock speed between 10 and 100 MHz. However, other larger and smaller processors are envisioned within the scope of this invention, as are clock speeds greater than 100 MHz.

In operation, time of arrival counter 92 counts clock pulses from line 91 received from clock 90 and provides an n-bit running parallel output on bus line 93 to gate 94. The latter n-bit parallel output passes through gate 94 to bus line 97 in response to the arrival of a cell arrival signal on line 95. The cell arrival signal is issued upon completion of arrival of a cell (typically 53 octets). The time of arrival on bus line 97 is applied to an input of processor 96 giving to processor 96 the time of arrival for each cell. Preferably, processor 96 stores the time of arrival in memory unit 98, along with values of TAT, increment I, limit L and rollover flags rollover_tat and rollover_ta. Processor 96 determines whether a received cell is conforming or non-conforming to a traffic contract agreed-upon between the user and the network as described above. Preferably, the finite word-length cell rate policing function envisioned herein is implemented as a computer program which is compiled and stored in static memory and used to program the operation of processor 96. Once processing of the cell time of arrival is completed based on the previously described cell rate policing function by processor 96, a signal is transmitted by processor 96 over signal line 101 to the network declaring the cell as either conforming or non-conforming. Non-conforming cells are tagged by the network and may be discarded depending on traffic conditions.

The invention described herein has many applications, including conformance testing, cell tagging and traffic shaping. In one preferred embodiment of the finite word-length cell rate algorithm (FCRA) envisioned herein, two FCRAs are executed in parallel for use in implementing traffic management based on a dual leaky bucket scheme. One FCRA is used to monitor the PCR previously defined (where I is defined as 1/PCR) and is implemented to have a small tolerance for cell delay variations. The second FCRA is used to monitor the sustainable cell rate (SCR) for a connection and is implemented having a large tolerance for cell delay variation to handle bursty traffic conditions. In the second FCRA, I is defined as the inverse of the SCR and L is defined as the burst tolerance. Burst tolerance is referred to here as an upper bound on the variability in the pattern of cell arrivals observed at a single measurement point with reference to the SCR.

In managing traffic at the UNI, the quality of service (QOS) negotiated between the user and the network will dictate the cell loss priority (CLP) on received cells for an established ATM connection. Cells having a CLP set to 0 typically have a higher priority than cells having a CLP of 1. Generally, delay sensitive traffic (eg. video and video phone data streams) will have a CLP set to 0 and such delay sensitive traffic is preferably given greater priority over other cells arriving at the UNI. In managing traffic flows at the UNI, the network must balance traffic submitted having a CLP set to 0 with traffic having a CLP set to 1 while accounting for the QOS agreed to under a user's traffic contract. Implementing parallel FCRAs, as envisioned within this invention, provides an effective hardware realizable mechanism for monitoring and policing traffic flows on cells having variable cell loss priorities at the UNI. Moreover, operation of the traffic control processor using two FCRAs in parallel allows the network to better manage bursty traffic flows at the UNI while providing a guaranteed QOS for traffic, to ensure that when such potentially congesting conditions arise, the risk of impairing QOS over multiple connections, especially for delay sensitive traffic, is minimized.

Figure 12:
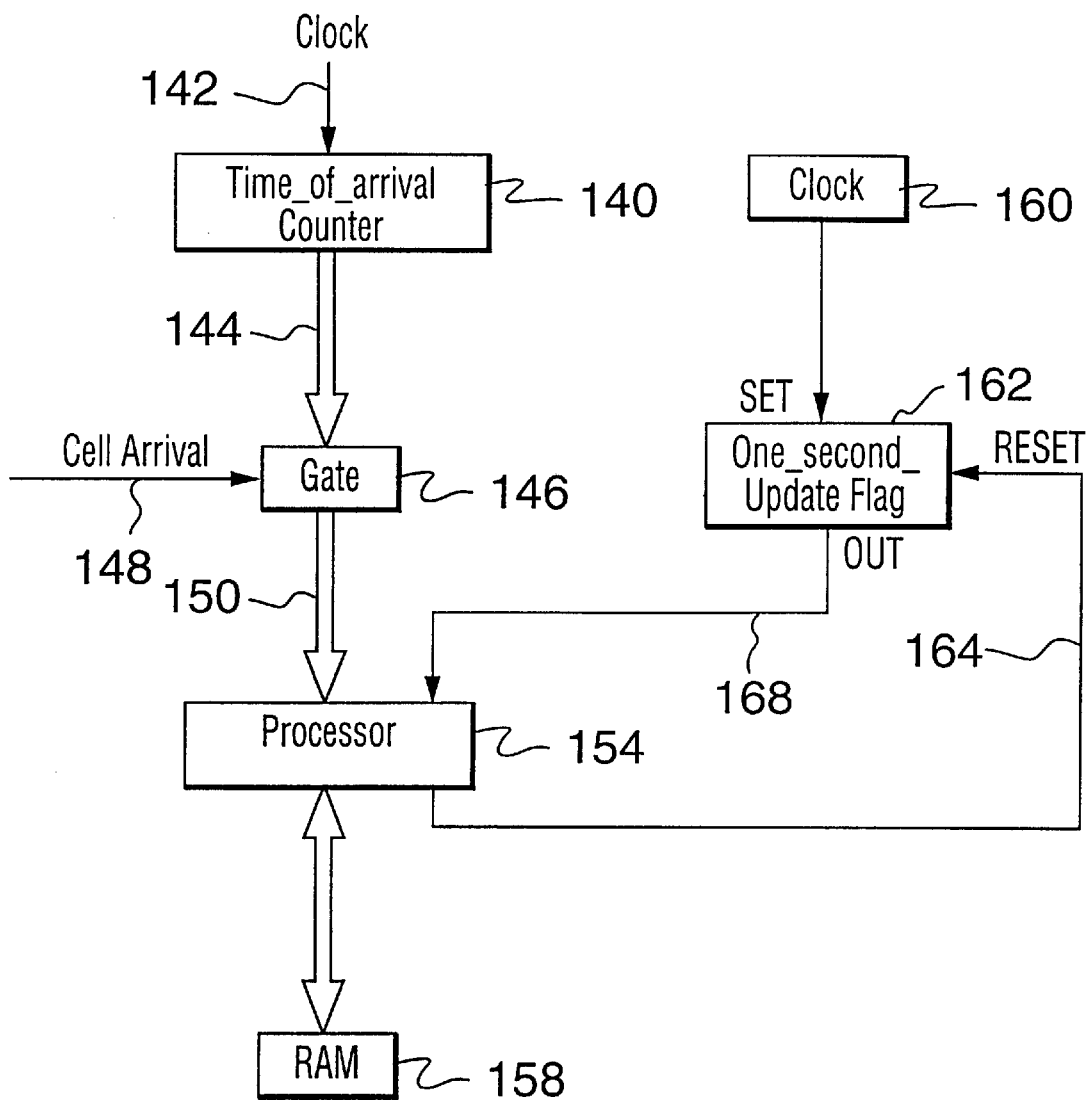
FIG. 12 is a schematic drawing of another embodiment of the cell conformity evaluator envisioned herein.

Referring to FIG. 12, there is shown an alternative embodiment to the traffic control system envisioned herein to implement the determination as to conforming and non-conforming cells which consists of a finite word-length counter 140 having a clock input 142 and an n-bit parallel output on bus 144 to gate 146. The n-bit parallel output from gate 146 goes to an input of a processor 154 in response to a cell arrival signal on line 148. Processor 154 communicates with RAM memory 158. In the alternative embodiment a one_second_update flag 162 has an input from clock 160 which provides an output at typically about 1 second intervals, but must occur at an interval less than one-half of the rollover period of the time-of-arrival counter 140. One_second_update flag 162 provides an output on line 168 to processor 154 in response to an input signal from clock 160. A reset line 164 from an output of processor 154 goes to a reset input of one_second_update flag 162.

In operation time-of-arrival counter 140 counts clock pulses from line 142 and provides an n-bit running parallel output on bus line 144 to gate 146. The latter n-bit parallel output passes through gate 146 to bus line 150 in response to the arrival of a cell arrival signal on line 148. The cell arrival signal is issued upon completion of arrival of a cell, typically having 53 octets. The time of arrival on bus line 150 is applied to an input of processor 154 giving to processor 154 the time of arrival for each cell. Processor 154 stores this value in RAM memory 158. Processor 154 also has stored the values of the theoretical arrival time, TAT, and the increment parameter I (typically 1/PCR or 1/SCR). Processor 154 goes through a routine to determine whether or not the cell that has just arrived is in conformance with the traffic contract as explained below. Upon completion of processing time for the cell arriving just after rollover, during which time the processor 154 suspends processing of the cell arrival time, a reset signal is sent by processor 154 to the reset input of one_second_update flag 162 which resets the latter and removes the flag input on line 168.

Figure 13:
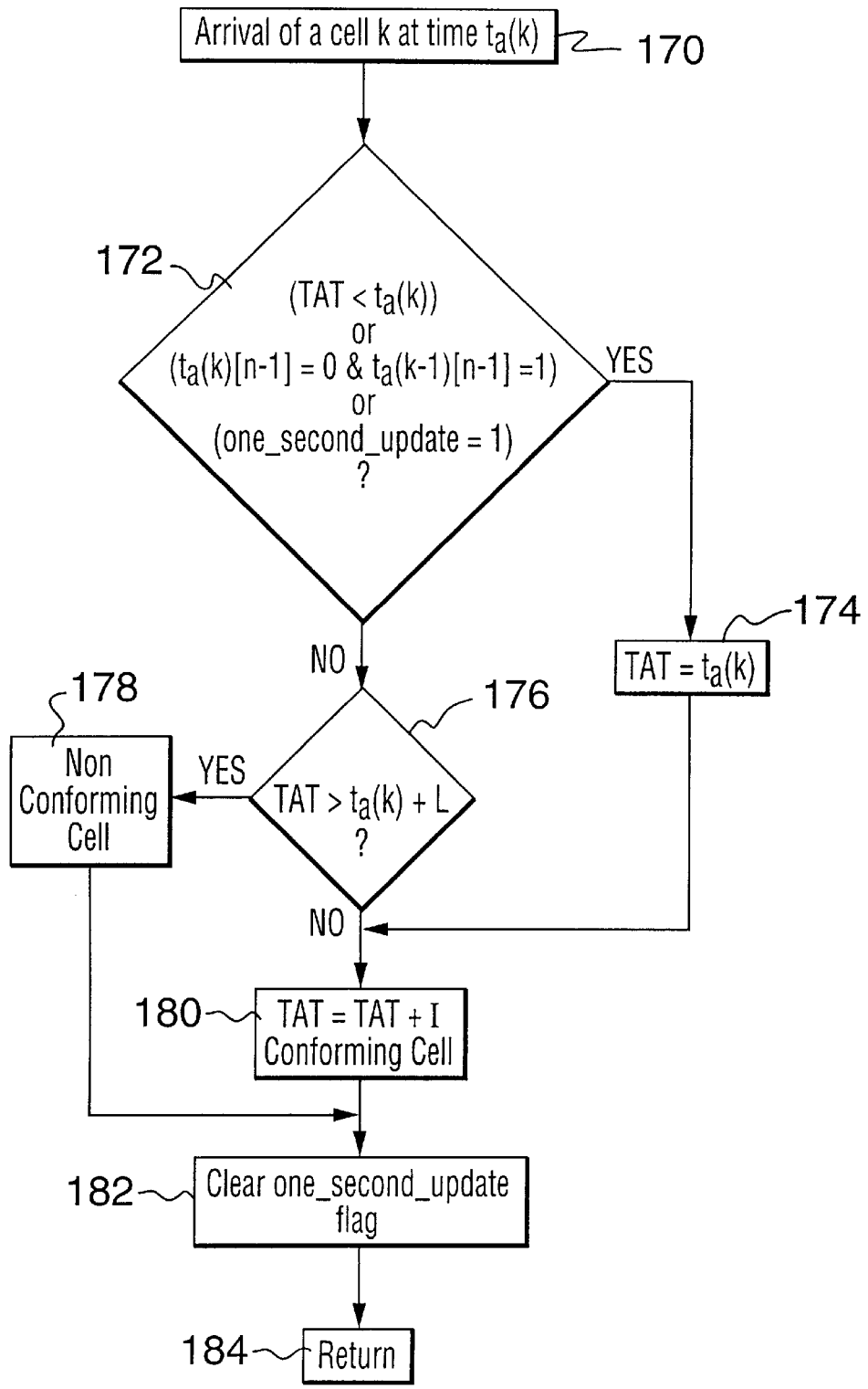
FIG. 13 is a flow chart for the operation of the circuit of FIG. 12.

Referring to FIG. 13, there is presented a flow chart of the method of operating the circuit in FIG. 12. If $t_a(k)$ [n−1:0] is the finite-word length n-bit value corresponding to $t_a(k)$, and $t_a(k)$ [n−1] is the most significant bit from the output of the time-of-arrival counter 140 as presented at step 170 then the first condition at step 172 is to determine whether or not $t_a(k)$ is greater than TAT. A second alternative test is to compare the most significant bit of the $k^{th}$ cell time of arrival, $t_a(k)$ [n−1] to the most significant bit of the k−1$^{th}$ (previous) cell, $t_a(k-1)$ [n−1]. If $t_a(k)$[n−1]=0 and $t_a(k-1)$[n−1]=1, then the time-of-arrival counter 140 has rolled over and policing should be suppressed on this cell to ensure a compliant cell is not declared non-compliant. Finally, to prevent incorrect identification of non-compliant cells on very slow rate connections, a flag known as the one_second_update flag 162 is set to 1 on one-second intervals as delimited by clock 160. This one_second_update flag is an external process which updates the one_second_update flag 162 at regular (nominally one second) intervals as delimited by clock 160. It is important to note that the one_second_update flag need only be set at an interval less than half of the rollover period of the time-of-arrival counter 140. If this flag is set, then policing will also be suppressed for the current cell. If the one_second_update flag 162 is set, it is cleared immediately upon completion of the algorithm. If all comparisons in the first decision branch fail, then the algorithm next tests if TAT>$t_a(k)$+L at step 176 to determine compliance. If the test is "yes" then the cell is declared non-conforming at step 178 while if the answer is "no" then TAT is indexed by parameter I at step 180.

If any one of the three tests in step 172 is passed, then TAT is set equal to $t_a(k)$ at step 174 and then the test at step 176 is implemented as explained above. In either case the one_second_update flag is cleared at step 182 and the system returns to the beginning at step 184 to process the time-of-arrival of the next cell.

It will be obvious to one skilled in the art that the system and method of traffic control envisioned within the scope of this invention may have various applications beyond conformance testing, cell tagging and traffic shaping, and may be implemented to achieve the functionality envisioned herein in various ways.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method, in a cell-based network, of determining compliance and non-compliance of an arriving cell k, having a time of arrival $t_a(k)$, based on a traffic contract, agreed-upon between a user and the network, and a theoretical arrival time (TAT), wherein TAT has an initial value equal to the time of arrival of a first cell $t_a(1)$ and the traffic contract includes limit parameter L, the method comprising the steps of:

(a) measuring $t_a(k)$;

(b) comparing TAT with $t_a(k)$ while adjusting for any rollover in $t_a(k)$ and, if TAT is less than $t_a(k)$, declaring the cell conforming and updating TAT;

(c) in the event TAT is not less than $t_a(k)$, comparing TAT with $t_a(k)$+L while adjusting for any rollover in $t_a(k)$ and, if TAT is less than or equal to $t_a(k)$+L, declaring the cell conforming and updating TAT; and (d) in the event TAT is not less than or equal to $t_a(k)$+L, declaring the cell non-conforming;

wherein the traffic contract includes an increment parameter I and, wherein updating TAT in step (b) includes setting TAT equal to $t_a(k)$+I and storing TAT in an n-bit counter for TAT; and wherein updating TAT in step (c) includes incrementing TAT by I and storing TAT in the n-bit counter for TAT.

2. A method according to claim 1, including the step of: compensating for long inter-cell arrival times.

3. A method according to claim 1, wherein comparing TAT with $t_a(k)$ in step (b) includes adjusting for any rollover in TAT and wherein comparing TAT with $t_a(k)$+L in step (c) includes adjusting for any rollover in TAT.

4. A method according to claim 3, wherein the traffic contract includes an increment parameter I, wherein updating TAT in step (b) includes setting TAT equal to $t_a(k)$+I, saturating TAT if a double rollover of TAT has occurred and storing TAT in an n-bit counter for TAT; and wherein updating TAT in step (c) includes incrementing TAT by I, saturating TAT if a double rollover of TAT has occurred and storing TAT in the n-bit counter for TAT.

5. A method according to claim 3, including after step (a) the step of tracking $t_a(k)$ and TAT for rollovers.

6. A method according to claim 5, wherein the step of tracking $t_a(k)$ and TAT for rollovers includes the step of:

determining if an n-bit counter for $t_a(k)$ and an n-bit counter for TAT have rolled over.

7. A method according to claim 3, including the step of: compensating for long inter-cell arrival times.

8. A method, in a cell-based network, of determining compliance and non-compliance of an arriving cell k, having a time of arrival $t_a(k)$, based on a traffic contract, agreed-upon between a user and the network, and a theoretical arrival time (TAT), wherein TAT has an initial value equal to the time of arrival of a first cell $t_a(1)$ and the traffic contract includes limit parameter L, the method comprising the steps of:

(a) measuring $t_a(k)$;

(b) computing finite values for TAT, $t_a(k)$ and $t_a(k)+L$, including adjusting for rollovers of $t_a(k)$ and TAT, and storing the finite values for TAT, $t_a(k)$ and $t_a(k)+L$ in finite counters for TAT, $t_a(k)$ and $t_a(k)+L$, respectively;

(c) testing if the finite counter for TAT is less than or equal to the finite counter for $t_a(k)$, and if a result of "yes" is produced, declaring the cell conforming and updating TAT;

(d) in the event a result of the test in step (c) is "no", testing if the finite counter for TAT is less than or equal to the finite counter for $t_a(k)+L$, and if a result of "yes" is produced, declaring the cell conforming and updating TAT;

(e) declaring a cell non-conforming in the event the finite counter for TAT is not less than or equal to the finite counter for $t_a(k)+L$ wherein the traffic contract includes an increment parameter I.

9. A method according to claim 8, further including before step (b) the step of:

determining if n-bit counters for $t_a(k)$ and TAT have rolled over.

10. A method according to claim 8, including n-bit counters for TAT and $t_a(k)$, a rollover flag for TAT, a rollover flag for $t_a(k)$, and wherein step (c) includes the steps of:

(i) concatenating the rollover flag for TAT to a most significant bit of the n-bit counter for TAT to produce a first result and storing the first result in the finite counter for TAT;

(ii) concatenating the rollover flag for $t_a(k)$ to a most significant bit of the n-bit counter for $t_a(k)$ to produce a second result and storing the second result in the finite counter for $t_a(k)$; and (iii) setting the finite counter for $t_a(k)+L$ equal to L+the finite counter for $t_a(k)$.

11. A method according to claim 8, wherein the limit parameter L represents a cell delay variation and the increment parameter I represents an inverse of a peak cell rate.

12. A method according to claim 8, wherein the limit parameter L represents a burst tolerance and the increment parameter I represents an inverse of a sustainable cell rate.

13. A method according to claim 8, including the step of: compensating for long inter-cell arrival times by setting an update flag at regular intervals equal to the rollover period of the time-of-arrival counter for $t_a(k)$ in order that policing be suppressed when said update flag is set.

14. A method according to claim 8, including the step of compensating for long inter-cell arrival times by updating TAT, and rollover flags for TAT and $t_a(k)$, on a periodic boundary.

15. A system for determining compliance of arriving cells in a network based on a traffic contract, agreed-upon between a user and the network, and a theoretical arrival time (TAT), wherein TAT has an initial value equal to the time of arrival of a first cell $t_a(1)$, the network includes a source of clock pulses and a source of cell arrival signals, and the traffic contract includes limit parameter L, the system comprising:

(a) an n-bit time of arrival counter having an input coupled to the source of clock pulses;

(b) a parallel n-bit gate having a first input coupled to said n-bit time of arrival counter and a second input coupled to the source of cell arrival signals; and (c) a processor having an input coupled to said gate, the processor comprising:

(i) comparing and declaring means for:

(aa) comparing TAT with a cell arrival time, $t_a(k)$, while adjusting for rollovers of TAT and $t_a(k)$ and, if TAT is less than $t_a(k)$, declaring the cell conforming and updating TAT;

(bb) comparing TAT with $t_a(k)+L$ while adjusting for rollovers of $t_a(k)$ and TAT and, if TAT is less than or equal to $t_a(k)+L$, declaring the cell conforming and updating TAT; and (cc) declaring the cell non-conforming.

16. A system according to claim 15, wherein the processor includes means for saturating TAT if a double rollover of TAT occurs in either of conditions (aa) and (bb) in (c)(i).

17. A system according to claim 16, wherein the processor includes a flag to track a most significant bit of an n-bit word-length counter for $t_a(k)$ and a rollover flag for tracking TAT.

18. A system according to claim 15, wherein said comparing and declaring means includes means for setting TAT equal to $t_a(k)+I$ and saturating TAT if a double rollover of TAT is detected in (aa); and means for incrementing TAT by I and saturating TAT if a double rollover of TAT is detected in (bb).

19. A system according to claim 15, wherein the system includes means for compensating for long inter-cell arrival times.

20. A system according to claim 19, wherein the system includes a rollover flag for TAT and a flag to track a most significant bit of $t_a(k)$, and wherein said means for compensating for long inter-cell arrival times includes means for updating said TAT, said rollover flag for TAT and said flag to update a most significant bit of $t_a(k)$.

21. A system according to claim 15, including a memory unit, coupled to the processor, operative to store values of TAT, $t_a(k)$, and L.

22. A system for determining compliance of arriving cells in a network based on a traffic contract, agreed-upon between a user and the network, and a theoretical arrival time (TAT), wherein TAT has an initial value equal to the time of arrival of a first cell $t_a(1)$, the network includes a source of clock pulses and a source of cell arrival signals, and the traffic contract includes limit parameter L, the system comprising:

(a) an n-bit time of arrival counter having an input coupled to the source of clock pulses;

(b) a parallel n-bit gate having a first input coupled to said n-bit time of arrival counter and a second input coupled to the source of cell arrival signals; and (c) a processor having an input coupled to said gate, the processor comprising:
  (i) an n-bit word-length counter for each of $t_a(k)$ and TAT;
  (ii) means for determining if the n-bit word-length counters for $t_a(k)$ and TAT have rolled over;
  (iii) means for computing finite values for TAT, $t_a(k)$ and $t_a(k)+L$, including adjusting for rollovers detected in (c)(ii), and storing the finite values in finite m-bit counters for TAT and $t_a(k)$, and finite r-bit counter for $t_a(k)+L$, respectively, where m and r are greater than n;
  (iv) means for (aa) testing if the finite value for TAT is less than or equal to the finite value for $t_a(k)$, and (bb) testing if the finite value for TAT is less than or equal to the finite value for $t_a(k)+L$;
  (v) means for updating TAT, detecting any rollover and double rollover of TAT and declaring the cell conforming if either of conditions (aa) and (bb) in (c)(iv) is true; and
  (vi) means for declaring the cell non-conforming if all conditions in (c)(iv) are false.

23. A system according to claim 22, wherein the system includes means for saturating TAT if a double rollover of TAT is detected.

24. A system according to claim 23, wherein the traffic contract includes an increment parameter I and the processor includes:

means for setting TAT equal to either of $t_a(k)+I$ and TAT+I in (c)(v).

25. A system according to claim 24, wherein limit parameter L is a cell delay variation and increment parameter I is an inverse of a peak cell rate.

26. A system according to claim 24, wherein limit parameter L is a burst tolerance and increment parameter I is an inverse of a sustainable cell rate.

27. A system according to claim 22, including a memory unit, coupled to the processor, operative to store values of TAT, $t_a(k)$ and L.

28. A system according to claim 22, including means for compensating for long inter-cell arrival times.

29. A system according to claim 28, wherein the system further includes a rollover flag for TAT and a flag to track a most significant bit of $t_a(k)$, and wherein said means for compensating for long inter-cell arrival times includes means for updating said TAT, rollover flag for TAT and flag to update a most significant bit of $t_a(k)$.

30. A system according to claim 28, wherein said means for compensating for long inter-cell arrival times comprises an update flag and an update signal generator, coupled to the processor, operative to transmit update signals to set the update flag and operative to receive reset signals from the processor for resetting the update flag, and a user setable clock coupled to the update signal generator operative to send clock signals to the update signal generator.

* * * * *

UNITED STATES PATENT AND TRADEMARK OFFICE
CERTIFICATE OF CORRECTION

PATENT NO. : 6,108,303
DATED : August 22, 2000
INVENTOR(S) : Maher Nihad Fahmi and John Richard Bradshaw It is certified that error appears in the above-identified patent and that said Letters Patent is hereby corrected as shown below:

Column 2,
Line 35, delete "arrical" before the first occurrence of "time" and substitute -- arrival --;
Line 52, delete "AT-based" and substitute -- ATM-based --.

Column 3,
Line 12, after "$t_\alpha(k)$" insert -- . --.

Column 4,
Line 8, delete "L+the" before "finite" and substitute -- L + the --.

Column 6,
Line 26, delete "among" after the first occurrence of "the" and substitute -- amount --.

Column 10,
Line 5, delete "$t_\alpha(n-1)$)," before "are" and substitute -- ta(n-1)) , --;
Line 21, delete "='0')" before "then" and substitute -- = '0') --;
Line 26, delete "(others =>'1';" and substitute -- (others =>'1'); --;
Line 32, delete "_finite + I" and substitute -- _finite + I; --.

Column 14, claim 1,
Line 38, delete "measuring $t_\alpha(k)$;" and substitute -- measuring $t_\alpha(k)$; --.

Column 15, claim 10,
Line 55, delete "L+the" and substitute -- L + the --.

Signed and Sealed this

Twenty-ninth Day of January, 2002

*Attest:*

*Attesting Officer*

JAMES E. ROGAN
*Director of the United States Patent and Trademark Office*